Patented Oct. 4, 1938

2,131,998

UNITED STATES PATENT OFFICE 2,131,998

CYCLIC ACETAL

Kurt Billig, Frankfort-on-the-Main-Hochst, Germany, assignor to I. G. Farbenindustrie Aktiengesellschaft, Frankfort-on-the-Main, Germany No Drawing. Application January 14, 1936, Serial No. 59,156. In Germany January 17, 1935

6 Claims. (Cl. 260—338)

The present invention relates to cyclic acetals more particularly to products of the following general formula:

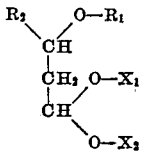

wherein

R₁ stands for an aliphatic radical containing at least two carbon atoms and a hydroxy group
R₂ for hydrogen or a lower aliphatic hydrocarbon radical
X₁ and X₂ together for two carbon atoms of the chain of an aliphatic radical said products being clear, colorless liquids, miscible with most organic solvents.

I have found that, when the reaction of unsaturated aldehydes with polyoles containing 2 hydroxyl-groups which are separated by at least one carbon atom, or with substitution products of these groups of bodies is carried out at a raised temperature and in the presence of a strong acid, the double bond also enters into reaction and that the hitherto unknown cyclic acetals, substituted in β-position with monohydroxy-alkoxy-groups or with polyhydroxy-alkoxy-groups, are obtained. Besides the above named alcohols there may be transformed also glycols with acroleine into the corresponding compounds. The reaction of the unsaturated aldehydes with dioles or polyoles or the substitution products thereof with formation of cyclic acetals substituted in β-position with mono-hydroxy-alkoxy-groups or with poly-hydroxy-alkoxy-groups may not only be carried out at a raised temperature but it sets in also under mild conditions, it being suitable in general to extend the reaction time.

As glycols capable of reacting there may be used, for instance: ethyleneglycol, propyleneglycol, glycerine, monochlorhydrin, penta-erithrite, mannite, sorbite; as unsaturated aldehydes there may be used: acroleine, crotonaldehyde, chlorocrotonic aldehyde and others, it having to be regarded that ethyleneglycol and monochlorhydrin can only be caused to react with acroleine.

The new products may be used as solvents, softening agents and intermediate products.

The following examples serve to illustrate the invention but they are not intended to limit it thereto; the parts are by weight:

(1) 70 parts of crotonaldehyde and 270 parts of 1.3-butyleneglycol are heated to 90° C. to 100° C. 10 parts of 1.3-butyleneglycol, saturated with dry hydrochloric acid gas, are added thereto. While violently boiling the mixture, the temperature increases to 120° C. to 121° C. After a further boiling for 5 minutes the whole is cooled, neutralized with alkali and fractionated advantageously under a reduced pressure.

Besides the reaction water, small quantities of the unsaturated cyclic acetal and the excess of butyleneglycol the main reaction product distils between a temperature of 140° C. and 160° C. and under a pressure of 10 mm.; this product is the butyleneglycol cyclic acetal of the β-(3-hydroxy-butoxy-1)-butyraldehyde and has the following formula:

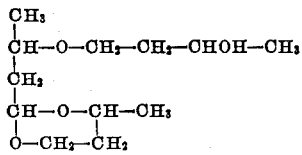

wherein the primary alcohol group of the 1.3-butyleneglycol is added on the double bond. This compound distils in the pure state under a pressure of 10 mm. at a temperature of 150° C. to 152° C. or under a pressure of 753 mm. and at a temperature of 281° C. to 284° C. and has the specific gravity of 1.0072 at 20° C. or 1.0195 at 4° C., respectively. The compound is miscible in any proportion and to a clear solution with water, methanol, ethanol, acetone, ether, dioxane, pyridine, formic acid, glacial acetic acid, chloroform, carbon tetrachloride, carbon disulfide, benzene and petroleum ether.

Besides hydrochloric acid also other strong acids, for instance, hydrobromic acid β-naphthalene sulfonic acid and others yield the same good reaction.

(2) A mixture of 350 parts of 2-methyl-pentane-2.4-diol and 56 parts of acroleine is heated for 8 to 12 hours on the steam bath together with 3 parts of ethyl alcohol, saturated with hydrochloric acid gas. After the addition of 2 parts of prepared chalk the whole is fractionated under a reduced pressure. Besides the reaction water, the excess of 2-methyl-pentane-2.4-diol, small quantities of the unsaturated cyclic acetal from acroleine and 2-methyl-pentane-2.4-diol there distils as the main product the cyclic acetal from propionaldehyde, substituted in β-position with the (1.3-dimethyl-3-hydroxy-butoxy-1-)- group and the 2-methyl-pentane-2.4-diol; the cyclic acetal has the following formula:

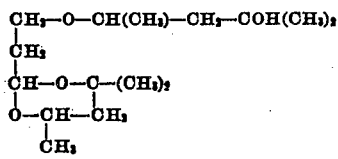

The product boils at 135° C. to 140° C. under a pressure of 4 mm. and has a lower specific gravity than water. It is miscible in any proportion with ether, benzene, petroleum ether, but it is slightly soluble in water.

(3) 200 parts of glycol are mixed with 56 parts of acroleine; 3 parts of glycol, saturated with hydrochloric acid gas, are added to this mixture. The whole is heated for 5 minutes on the steam bath. After cooling and after the addition of 1.5 parts of prepared chalk the mixture is fractionated advantageously under a reduced pressure. After the reaction water and the excess of glycol have been distilled, the main product distils between 130° C. and 150° C. and under a pressure of 14 mm.; this product is the cyclic acetal of the (2-hydroxy-ethoxy-1-)-propionaldehyde and has the following formula:

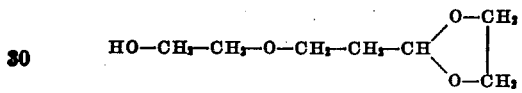

The pure product boils at 135° C. to 139° C. under a pressure of 12 mm. It is miscible in any proportion and to a clear solution with water, ether, benzene but not with petroleum ether.

(4) A mixture of 270 parts of 1.3-butyleneglycol and 56 parts of acroleine is mixed with 3 parts of butyleneglycol, saturated with hydrochloric acid gas, and the whole is heated for half an hour on the steam bath. After a further treatment in the same manner described in Example 3 there distils between 150° C. and 175° C. under a pressure of 14 mm. the 1.3-butyleneglycol cyclic acetal of the (3-hydroxy-butyloxy-1-)-butyraldehyde; the new product has the following formula:

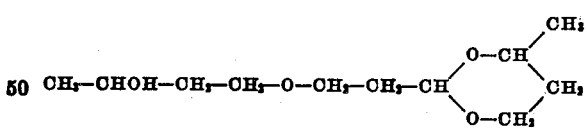

The pure product boils at 151° C. to 155° C. under a pressure of 12 mm. It is miscible in any proportion and to a clear solution with water, ether, benzene and petroleum ether.

(5) A mixture of 70 parts of crotonaldehyde, 90 parts of butyleneglycol and 125 parts of glycol is heated for 1 hour on the steam bath after 5 parts of glycol, saturated with hydrochloric acid gas, have been added. The whole is worked up as described in Example 3 and there is then obtained as the main product the 1.3-butyleneglycol cyclic acetal of the (2-hydroxy-ethoxy-1-)-butyraldehyde which distils between 130° C. and 150° C. under a pressure of 12 mm.; the new compound has the following formula:

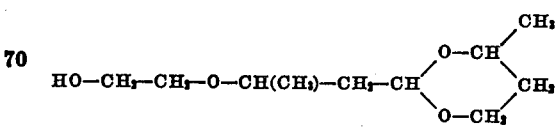

The pure product boils at 143° C. to 148° C. under a pressure of 10 mm. and is miscible in any proportion with water, ether, benzene and petroleum ether.

(6) A mixture of 330 parts of α-monochlorhydrine and 56 parts of acroleine is mixed with 3 parts of monochlorhydrine, saturated with hydrochloric-acid gas, and the whole is heated for 10 minutes on the steam bath. After cooling and after the addition of 1.5 parts of prepared chalk there is fractionated under a reduced pressure. After the reaction water and the excess of α-monochlorhydrine have been distilled the chlorhydrine cyclic acetal of the propionaldehyde substituted in β-position with the (3-chloro-2-hydroxy-propyloxy-1-)-group distils at 168° C. to 175° C. under a pressure of 4 mm. and has the following formula:

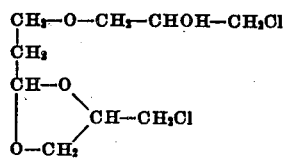

The product is miscible with alcohol, benzene, carbon tetrachloride, but not with water and petroleum ether.

(7) 200 parts of glycol are mixed with 56 parts of acroleine and after addition of 3 parts of glycol, saturated with hydrochloric-acid gas, the whole is heated for 2 hours at 40° C. to 50° C. After the addition of 1.5 parts of prepared chalk the mixture is advantageously fractionated under a reduced pressure. There is obtained the glycol cyclic acetal of the propionaldehyde substituted in β-position with the (2-hydroxy-ethoxy-1-)-group; the new product boils at 135° C. to 139° C. under a pressure of 12 mm. and has the following formula:

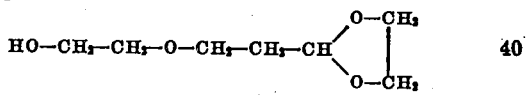

Besides hydrochloric acid also strong acids, for instance, hydrobromic acid, β-naphthalene sulfonic acid and others, yield the same good reaction.

(8) To a mixture of 270 parts of 1.3-butyleneglycol and 56 parts of acroleine there are added 3 parts of butyleneglycol, saturated with hydrochloric-acid gas, and the whole is stirred for 16 hours at 40° C. to 50° C. This mixture is worked up as described in Example 7 and there is obtained the 1.3-butyleneglycol cyclic acetal of the butyraldehyde substituted in β-position with the (3-hydroxy-butyloxy-1-)-group. The new product boils at 151° C. to 155° C. under a pressure of 12 mm.

(9) To a mixture of 70 parts of crotonaldehyde and 270 parts of 1.3-butyleneglycol there are added 5 parts of butyleneglycol, saturated with hydrochloric-acid gas, and 40 parts of dehydrated calcium chloride and the whole is stirred for 24 hours at 40° C. to 50° C. After the neutralization with prepared chalk and the separation of the layer of calcium chloride there is fractionated under a reduced pressure. After the first runnings which consist of small quantities of unsaturated cyclic acetal and an excess of butyleneglycol there distils the 1.3-butyleneglycol cyclic acetal of the butyraldehyde substituted in the β-position with the (3-hydroxy-butoxy-1-)-group. The new product boils in the pure state at 150° C. to 152° C. under a pressure of 10 mm.

(10) A mixture of 70 parts of crotonaldehyde, 90 parts of 1.3-butyleneglycol and 125 parts of glycol is stirred for 24 hours at 40° C. to 50° C. after the addition of 5 parts of glycol, saturated with hydrochloric-acid gas. The whole is worked up in the same manner as described in Example 7 and there is obtained as main product the 1.3-butyleneglycol cyclic acetal of the butyraldehyde substituted in β-position with the (2-hydroxy-ethoxy-1-)-group. The new product boils at 143° C. to 148° C. under a pressure of 10 mm.

(11) A mixture of 330 parts of α-monochlorhydrine and 56 parts of acroleine is mixed with 3 parts of monochlorhydrine, saturated with hydrochloric-acid gas, and the whole is stirred for 20 hours at 40° C. to 50° C. After cooling and after the addition of 1.5 parts of prepared chalk there is fractionated under a reduced pressure. After the reaction water and the excess of α-monochlorhydrine have been distilled the chlorhydrine cyclic acetal of the propionaldehyde substituted in β-position with the (3-chlor-2-hydroxy-proploxy-1-)-group distils at 168° C. to 175° C. under a pressure of 4 mm. and has the following formula:

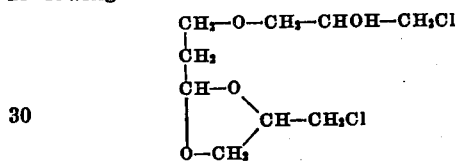

The product is miscible with alcohol, benzene, carbon tetrachloride, but not with water and petroleum ether.

I claim:

1. The products of the following general formula:

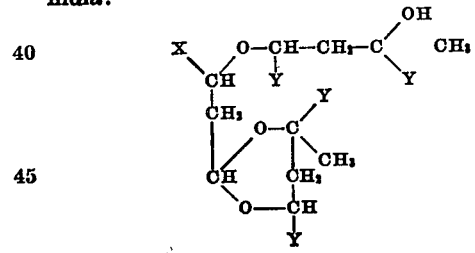

wherein X and Y stand for a substituent of the group consisting of hydrogen and methyl, said products being clear, colorless liquids, miscible with most organic solvents.

2. The product of the following formula:

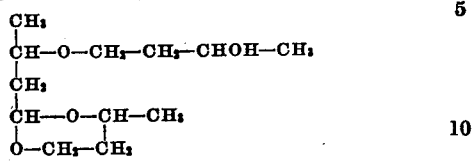

said product being a clear, colorless liquid, miscible with most organic solvents.

3. The process which comprises causing 270 parts of 1.3-butyleneglycol to act upon 70 parts of crotonaldehyde at a temperature of about 90° C. to 100° C. in the presence of dry hydrogen chloride.

4. The process which comprises causing about two mols of a divalent aliphatic alcohol of from three to six carbon atoms and containing one —CH₂— group between the carbon atoms attached to the hydroxyl groups to react upon about one mol of a lower unsaturated aliphatic aldehyde of the group consisting of acrolein and crotonic aldehyde, in the presence of a strong acid and at a temperature between about 40° and about 100° C.

5. The process which comprises causing about two mols of a divalent aliphatic alcohol of from three to six carbon atoms and containing one —CH₂— group between the carbon atoms attached to the hydroxyl groups to react upon about one mol of a lower beta-unsaturated aliphatic aldehyde of the group consisting of acrolein and crotonic aldehyde, in the presence of a strong acid and at a temperature between about 40° and about 100° C.

6. The process which comprises causing about two mols of a divalent aliphatic alcohol of from three to six carbon atoms and containing one —CH₂— group between the carbon atoms attached to the hydroxy groups to react upon about one mol of a lower beta-unsaturated aliphatic aldehyde of the group consisting of acrolein and crotonic aldehyde, at a temperature of about 90° C.

KURT BILLIG.